US006627089B1

(12) United States Patent
Wilkinson

(10) Patent No.: US 6,627,089 B1
(45) Date of Patent: Sep. 30, 2003

(54) WATER MAIN RECIRCULATING/ FILTERING/FLUSHING SYSTEM AND METHOD

(76) Inventor: Chris E. Wilkinson, 35698 Rd. 212, Woodlake, CA (US) 93286

(*) Notice: Subject to any disclaimer, the term of this patent is extended or adjusted under 35 U.S.C. 154(b) by 18 days.

(21) Appl. No.: 10/121,566

(22) Filed: Apr. 12, 2002

(51) Int. Cl.[7] .............................. C02F 1/78; B08B 3/00; E03B 7/07

(52) U.S. Cl. ........................ 210/754; 210/805; 210/136; 210/167; 210/196; 210/198.1; 210/241; 210/416.3; 210/94; 137/15.05; 134/22.12

(58) Field of Search ................................ 210/754, 805, 210/94, 136, 167, 196, 198.1, 241, 251, 416.3; 137/15.01, 15.04, 15.05; 134/22.11, 22.12

(56) References Cited

U.S. PATENT DOCUMENTS

| | | | | |
|---|---|---|---|---|
| 5,360,488 | A | * | 11/1994 | Hieatt et al. |
| 5,915,395 | A | * | 6/1999 | Smith |
| 6,062,259 | A | * | 5/2000 | Poirier |
| 6,170,514 | B1 | * | 1/2001 | Esmailzadeh |

* cited by examiner

*Primary Examiner*—Robert Popovics
(74) *Attorney, Agent, or Firm*—Donald W. Meeker

(57) ABSTRACT

A truck houses a closed recirculation system having a series of hoses, filters and pumps interconnecting a first point and second point, preferably hydrants, of a water supply system. A flow of water pumped outside of the water supply system through the filters causes an increased water flow within the section of the water supply system between the second and the first point to clean the section of deposits, sediment, particulates and other undesirable matter. All of the filtered water is returned to the water supply system. The water may be inspected and chlorinated.

19 Claims, 1 Drawing Sheet

WATER MAIN RECIRCULATING/FILTERING/FLUSHING SYSTEM AND METHOD

BACKGROUND OF THE INVENTION

1. Field of the Invention

The present invention relates to a method and equipment for flushing a water main and in particular to a pump and filter system and method of flushing a section of water main between hydrants filtering the sediment and particulates out of the water and recirculating it back into the water main without wasting the water.

2. Description of the Prior Art

Almost all water providers are required to have their mains large enough to provide a sufficient flow for fire protection. This means that the flow rate or velocities in the large mains during normal use are reduced significantly, allowing any particulates to settle to the bottom. After a length of time the particulates would build up and if there is any surges in the system the particulates are stirred up causing the water to appear dirty. To remedy this occurrence the entire system would have to be flushed annually from hydrants and blow-offs throughout the entire system. This method wastes millions of gallons of water each year, could possibly cause property damage, flooding the streets causing traffic problems and is usually performed at night to avoid the public eye, making the flushing procedure very costly.

In addition to the above problems new regulations require that the water be dechlorinated before it is allowed to drain into any storm drainage system and you will also be required to have a NPDES permit plus containment systems in place to protect against washing silt into the drains. Not to mention that you will need to shut down multiple valves to isolate the section of main that you want to flush.

From time to time, it is necessary to flush water systems which deliver potable tap water. This is especially the case with newly lined fresh water mains which have been repaired by lining interior surfaces of the mains with a resin material. Before water passing through a pipe which is used for drinking water purposes, it is necessary to thoroughly flush the mains with tap water. In order to maintain water quality, it is also necessary, from time to time, to flush local tap water delivery systems such as neighborhood and subdivision tap water systems.

Generally, discharges from potable water systems result from overflow, flushing, disinfection, hydrostatic testing, mechanical cleaning or dewatering of vessels or structures used to store or convey potable water. This frequently includes fire hydrant flushing in which high velocity streams are generated on the order of 2,000 gallons per minute for a period of 10–15 minutes. By periodically testing fire hydrants, it can be determined if sufficient water is available in the system for fire fighting purposes.

Potable tap water usually contains residual chlorine. The Federal Clean Water Act and state agency regulations regarding discharges of potable water, such as regulations promulgated by the Maryland Department of the Environment, require that total maximum daily amount of residual chlorine must be less than 0.1 mg/liter. At levels higher than 0.1 mg/liter, aquatic life is endangered and fish kills occur. Since potable tap water and water discharged from fire hydrants which originates with county and municipal water systems is necessarily initially chlorinated, heavy discharges of this water will adversely affect aquatic life unless the amount of residual chlorine is reduced to less than 0.1 mg/liter. In the past, this was either not done or, when done, was attempted by injecting sodium sulfite into the discharge stream. This is a difficult process to perform and monitor because it is necessary to dispense sodium sulfite in controlled amounts according to the volume of water being treated. If there is too much sodium sulfite, it can itself cause pollution problems by interfering with pH levels and if the amount is insufficient, there will be excessive residual chlorine. It has been found that the injection approach requires not only highly skilled personnel, but extensive training. Moreover, the end result is unpredictable.

While some attempts have been made at improving water main flushing systems, the real problems of water waste and water quality still remain to be addressed.

U.S. Pat. No. 6,227,463, issued May 8, 2001 to Porter, provides a water treating device for attachment directly to a hydrant outlet. Tap water supply systems are flushed by opening fire hydrants and running potable water through the fire hydrants for a period of time. Since potable water usually contains chlorine, it is necessary to remove the chlorine before the water enters rivers, streams and bays in order to protect aquatic life. This is accomplished by passing the water through a diffuser attached to the fire hydrant, which diffuser contains a mesh bag with a sodium sulfite tablet therein. This still wastes huge quantities of water and adds chemicals to water being discharged into the environment.

U.S. Pat. No. 6,170,514, issued Jan. 9, 2001 to Esmailzadeh, shows a city water flushing and sludge prevention control apparatus for use with a city water system having a plurality of street water mains interconnected by branch water mains and having hydrants connected to the branch water mains, a city water flushing and sludge prevention apparatus consisting of: a sludge-prevention control valve insertable into a branch water main between two street water mains and closer to one of the two street water mains; the sludge-prevention control valve in the closed position preventing water from flowing through the branch water main from the closer street water main during a flushing operation, whereby all water flows through the branch water main from the more distant street water main and thereby flushes the portion of the branch water main between the sludge-prevention control valve and the more distant street water main; and a control mechanism adapted to close and open the sludge-prevention control valve. Again, this system dumps a tremendous amount of water and does not treat the water.

U.S. Pat. No. 5,911,255, issued Jun. 15, 1999 to Bond, claims a pipe cleaning method and device utilizing a partial blockage object positioned in a water pipe for a method of cleaning deposits from the inside of a pipe, comprising flushing a liquid through the pipe, and locally increasing the liquid flow rate adjacent the pipe wall due to the presence of the object. This system requires opening a hydrant to release the water filled with particulates removed from the linings of the water mains.

U.S. Pat. No. 5,201,338, issued Apr. 13, 1993 to McKeague, describes a system and device for flushing water mains. A water distribution system includes flushing hydrants having buried valve assemblies and a removable top stock carried from valve assembly to valve assembly. A vertical marker replaces the top stock when the hydrant is not in use. The buried valve assembly includes a valve urged closed by water pressure and an actuator rod extending through a spider in the top of a vertical barrel. A lock nut on the upper end of the actuator holds the valve closed even if water pressure is lost. The upper end of the vertical barrel includes an internally threaded adapter. The top stock includes a casing which is externally threaded to mate with the adapter and a second rod which is threaded to mate with the actuator rod. The hydrant is assembled by removing the lock nut and screwing the parts together while an operating screw is swung free, then swinging the operating screw into engagement with the second rod. A preferred embodiment permits water samples to be taken from the hydrant. An alternative embodiment provides automatic draining systems to make the hydrant frost proof. Again, this system wastes large quantities of water and dumps water with chemicals into the environment.

What is needed is a system for periodically cleaning water mains which does not waste water or dump municipal water containing chemicals and pipe sediments into the environment.

SUMMARY OF THE INVENTION

An object of the present invention is to provide a system and method for periodically cleaning water mains without wasting water and without dumping the municipal water containing chemicals and pipe deposits and sediments into the environment.

A related object of the present invention is to utilize an enclosed system and method which pumps water out of the water main between hydrants at higher flow rates to release deposits, particulates and sediment from the water main and then pump the water through filters to clean out the deposits, particulates and sediment, pumping the cleaned water back into the water main, thereby not wasting any water and not pumping chlorinated water, deposits, particulates and sediments into the environment.

One more object of the present invention is to provide a mobile system mounted on a truck containing the hoses, pumps, and filters used for the method of cleaning the water main one section at a time between hydrants using the closed recirculating pumping, filtering, and flushing method.

In brief, the mobile re-circulating/filtering/flushing machine comprises a large bobtail truck, semi truck/trailer or just a trailer. Mounted to the truck/trailer vehicle is a large multi-media filter system with one to five filter vessels all depending on the flow requirements needed to serve a particular application. On the inlet side of the filter system is a check valve and a section of clear tube to visually inspect the influent or incoming water. On the outlet side of the filter system is a spring-loaded flapper valve to keep the system from draining after disconnecting. A recirculating pump is installed to move the water in the circuit. Both inlet and outlet is connected to the hydrant or blow-off with a flexible hose that is rolled up after use. The system further comprises a metering system for rate of flow and a chemical injector for the addition of chlorine etc. to the water system.

The method of using the portable re-circulating/filtering/flushing system comprises circulating the water of a desired portion of main (at a flow rate of approximately 5 feet per second) out of a hydrant or blow-off, through the filter system then back into the water main through another hydrant or blow-off. This procedure would clean the sediment out of the water system while eliminating the need to waste large volumes of water, dechlorinate, deal with NPDES requirements/permits, flooding, private property damage and traffic problems.

Other applications for this machine and method are tank draining, tank cleaning and other uses where wasting water could cause many problems.

An advantage of the present invention is that it preserves water.

Another advantage of the present invention is that it prevents the dumping of water containing chlorine and other chemicals, deposits, sediments, and particulates from the water main into the environment.

An additional advantage of the present invention is that it provides a means for meeting environmental requirements for periodic flushing of a water supply system.

BRIEF DESCRIPTION OF THE DRAWINGS

These and other details of my invention will be described in connection with the accompanying drawing, which is furnished only by way of illustration and not in limitation of the invention, and in which drawing.

BEST MADE FOR CARRYING OUT THE INVENTION

Figure 1:
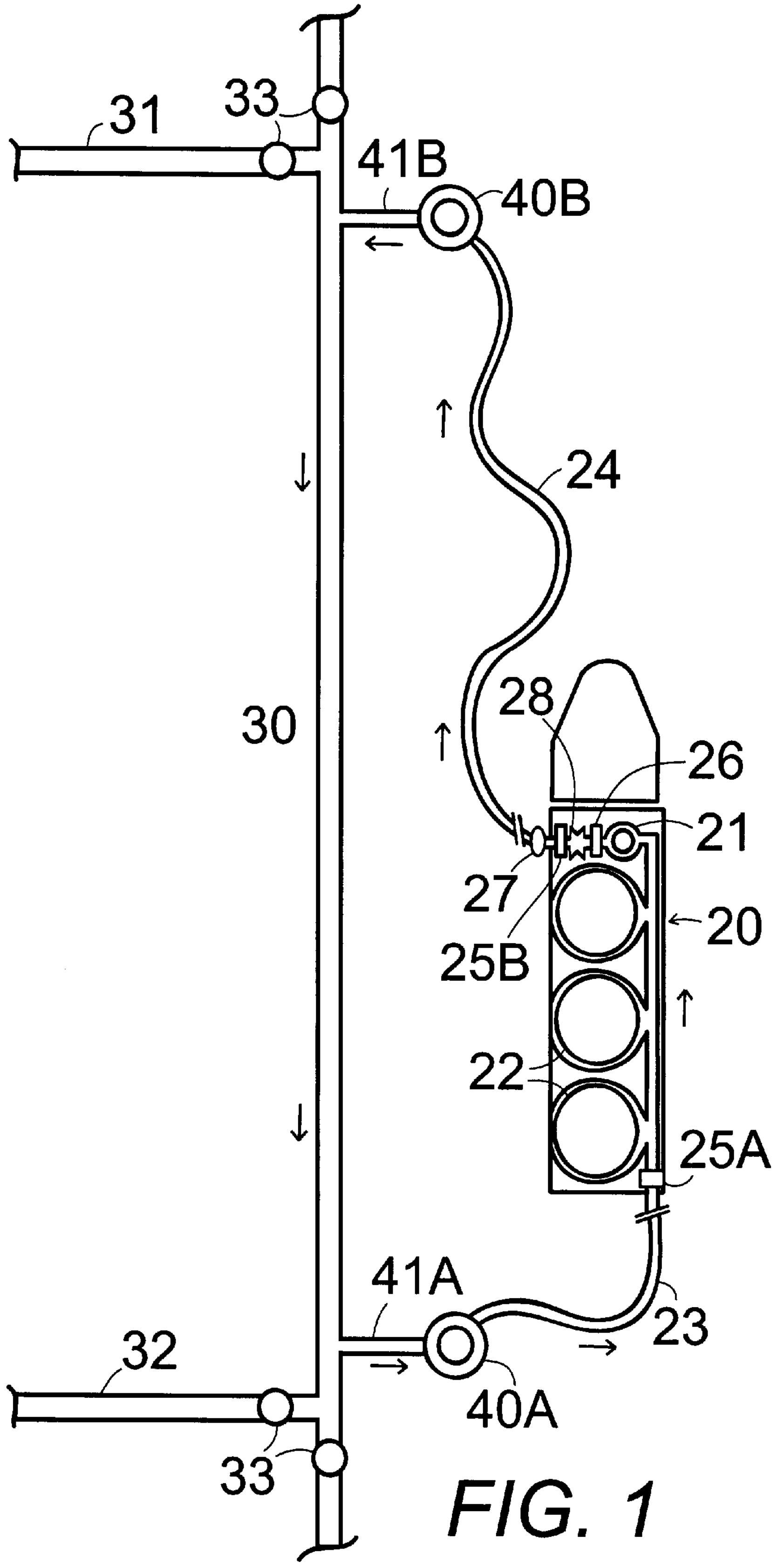
FIG. 1 is a diagrammatic view showing the components of the portable re-circulating/filtering/flushing system and indicating the flow utilized in the method of the invention.

In FIG. 1 a portable re-circulating/filtering/flushing system 20 for cleaning water supply systems in an environmentally responsible and efficient manner comprises at least one pump 21, at least one filter 22 and hoses 23 and 24 forming a closed conduit and filtering system mounted on a truck or other vehicle.

The closed conduit and filtering system conducts a flow of water (flow direction indicated by arrows) between a first point, preferably a hydrant 40A in a water supply system and a second point, preferably another hydrant 40B in a water supply system with water mains 30, 31, and 32 and valves 33 and trunk pipes 41A and 41B connected to the hydrants. The closed system conducts the flow of water out of the water supply system at the first point, the hydrant 40A, through a hose 23 and returns the flow of water, after filtering back into the water supply system at the second point, the hydrant 40B.

At least one pump 21 pumps the flow of water out of the water supply system from hydrant 40A through the filters 22 and back into the water supply system through hydrant 40B. The pump 21 causes an increased flow rate of the water flowing within the water supply system through water main 30 from the second point, hydrant 40B to the first point, hydrant 40A. The increased flow rate through the water main 30 cleans any undesirable matter, including deposits, sediment, and particulates in the water supply system between the two hydrants 40B and 40A.

Preferably a series of filters 22, but at least one filter, in the closed conduit system receives the flow of water outside of the water supply system filters out all of the undesirable matter from the water outside of the water supply system so that the water supply system is cleaned of all the undesirable matter in the water main 30 between the hydrants 40B and 40A. All of the flow of water taken from the water supply system is returned to the water supply system free of all the undesirable matter after filtering the water. No water is wasted or run off into the environment.

A means of inspecting the quality of the flow of water in the closed conduit system comprises at least one portion of the closed conduit system comprising a means for viewing and visually inspecting the flow of water, such as a check valve and a section of clear tube 25A to visually inspect the flow of water coming into the closed conduit system and another check valve and a section of clear tube 25B could be provided to inspect the flow of water leaving the filters 22.

A water testing and chlorinating system or other remedial water testing additive system 26 can add any desired matter to the outflow of water in the closed conduit system.

The closed conduit system preferably uses one first flexible hose 23 from the first point of the water supply system, hydrant 40A to the filters and one second hose 24 from the filters 22 to the second point of the water supply system, hydrant 40B. The second hose 24 is preferably provided with a spring-loaded flapper valve 27 to keep the system from draining after disconnecting, and thereby prevent any water from escaping The closed conduit system with the hoses 23 and 24, the filters 22, the pump 21, inspecting and testing and additive stations 25A, 25B, and 26 are all preferably mounted on a portable means of transport, such as a large bobtail truck, semi truck/trailer, a trailer or other mobil means for moving the system to all points in the water supply system for cleaning one section at a time.

In practice, a method of re-circulating/filtering/flushing for cleaning water supply systems in an environmentally responsible and efficient manner comprises the steps of pumping and filtering and conducting the flow of water through the closed conduit system 20 retaining all of the water within the closed conduit system and not letting any of the water escape into the environment.

The step of conducting a flow of water through the closed conduit system 20 between a first point, hydrant 40A, in a water supply system with the water main 30 and a second point, hydrant 40B in the water supply system comprises conducting the flow of water out of the water supply system at the first point, hydrant 40A, and returning the flow of water in to the water supply system at the second point, hydrant 40B.

The step of pumping the flow of water by at least one pump 21 from the first point, hydrant 40A, in the water supply through the closed conduit system 20 to the second point, hydrant 40B, in the water supply system creates an increased flow rate of the water flowing within the water supply system through the water main 30 from the second point, hydrant 40B, to the first point, hydrant 40A. The increased flow rate, preferably 5 feet per second, cleans any undesirable matter, such as deposits, sediment, particulates, and other contaminants in the water supply system between the second point, hydrant 40B and the first point, hydrant 40A.

The step of filtering the flow of water through preferably a series of filters 22, but though at least one filter, in the closed conduit system 20 comprises receiving the flow of water outside of the water supply system between the first point, hydrant 40A, and the second point, hydrant 40B, and filtering out all of the undesirable matter from the flow of water outside of the water supply system so that the water supply system water main 30 is cleaned of all the undesirable matter between the second point, hydrant 40B, and the first point, hydrant 40A, in the water supply system and all of the flow of water taken from the water supply system is returned to the water supply system free of all the undesirable matter after filtering the water.

A step of inspecting the flow of water in the closed conduit system 20 by a means of visually inspecting the quality of the flow of water in the closed conduit system comprises visually inspecting the flow of water through a check valve and a section of clear tube 25A where the water flow enters the closed conduit system 20 and, if desired, again through another check valve and section of clear tube 25B where the water flow exits the filters 22.

A step of testing the water and adding any desired matter to the flow of water in the closed conduit system can take place using a water testing and chlorinating system or other remedial water testing additive system 26 where a step can add any desired matter to the outflow of water in the closed conduit system, including the step of chlorinating the water.

The method further comprises preventing the draining of the system by providing in the at least one second hose 24 from the filters 22 to the second point, hydrant 40B, of the water supply system a spring-loaded flapper valve 27 to keep the system from draining after disconnecting.

The portable re-circulating/filtering/flushing system 20 is preferably mounted on a vehicle and is transported to each section of the water supply system to clean the entire system section by section in the water mains 30, 31, and 32 between pairs of hydrants, such as the water main 30 between the hydrants 40B and 40A.

Mounted to the truck/trailer vehicle is preferably a large multi-media filter system with one to five filter vessels 22 all depending on the flow requirements needed to serve a particular application. On the inlet side of the filter system is a check valve and a section of clear tube 25A to visually inspect the influent or incoming water. On the outlet side of the filter system is a spring-loaded flapper valve 27 to keep the system from draining after disconnecting. A recirculating pump 21 is preferred to move the water in the closed conduit system. Both inlet and outlet are preferably connected to the hydrants, 40A and 40B or blow-offs with flexible hoses 23 and 24 that are rolled up after use. The system further comprises a metering system 28 for rate of flow and a chemical injector 26 for the addition of chlorine etc. to the water system.

It is understood that the preceding description is given merely by way of illustration and not in limitation of the invention and that various modifications may be made thereto without departing from the spirit of the invention as claimed.

What is claimed is:

1. In a municipal water supply system having a plurality of sections including water mains, pipes and valves, the improvement comprising:

a re-circulating/filtering/flushing system including:

a closed conduit system having means to connect to an isolated section of said municipal water supply system to form a closed recirculating fluid circuit between a first point and a second point in said isolated section, said closed conduit system including at least one pump and at least one filter, wherein said pump is capable of pumping water through said closed fluid circuit at a flow rate sufficient to flush particulates and sediment from the first point of said isolated section for removal by said at least one filter, and thereafter, returning all of said water to the second point of said isolated section, substantially free of particulates and sediment.

2. The system of claim 1 further comprising a means of inspecting the quality of the flow of water in the closed conduit system.

3. The system of claim 2 wherein the means of inspecting the quality of the flow of water in the closed conduit system comprises at least one portion of the closed conduit system comprising a means for viewing and visually inspecting the flow of water.

4. The system of claim 3 wherein the means for viewing and visually inspecting the flow of water comprises a check valve and a section of clear tube to visually inspect the flow of water.

5. The system of claim 1 further comprising a means for adding any desired matter to the flow of water in the closed conduit system.

6. The system of claim 5 wherein the means for adding any desired matter to the flow of water in the closed conduit system comprises a chlorinating system.

7. The system of claim 1 wherein the closed conduit system comprises at least one first hose from the first point of the water supply system to the at least one filter.

8. The system of claim 7 wherein the closed conduit system comprises at least one second hose from the at least one filter to the second point of the water supply system.

9. The system of claim 8 wherein the at least one second hose from the at least one filter to the second point of the water supply system further comprises a spring-loaded flapper valve to keep the system from draining after disconnecting.

10. The system of claim 1 wherein the closed conduit system and the at least one filter and the at least one pump are mounted on a portable means of transport.

11. A method for flushing a section of a municipal water supply system comprising the steps of:

isolating a section of a municipal water supply system to be flushed;

connecting a closed conduit system to a first point and a second point of said isolated section;

pumping water at a rate sufficient to flush sediment and particulates from said first point in said isolated section through at least one filter in said closed conduit system to produce filtered water substantially free of sediment and particulates;

returning all of said filtered water to said second point of said isolated section; and disconnecting said closed conduit system from said isolated section.

12. The method of claim 11 further comprising the step of inspecting the flow of water in the closed conduit system.

13. The method of claim 12 wherein the step of inspecting the quality of the flow of water in the closed conduit system comprises visually inspecting the flow of water through a check valve and a section of clear tube.

14. The method of claim 11 further comprising the step of adding any desired matter to the flow of water in the closed conduit system.

15. The method of claim 14 wherein the step of adding any desired matter to the flow of water in the closed conduit system comprises chlorinating the water.

16. The method of claim 1 wherein the step of pumping further comprises pumping the flow of water through at least one first hose from the first point of the water supply system to the at least one filter.

17. The method of claim 16 wherein the step of pumping further comprises pumping the flow of water through at least one second hose from the at least one filter to the second point of the water supply system.

18. The method of claim 17 wherein the step of pumping further comprises preventing the draining of the system by providing in the at least one second hose from the at least one filter to the second point of the water supply system a spring-loaded flapper valve to keep the system from draining after disconnecting.

19. The method of claim 11 further comprising the step of transporting the closed conduit system and the at least one filter and the at least one pump on a portable means of transport.

* * * * *